United States Patent [19]

Suzuki

[11] 4,438,318

[45] Mar. 20, 1984

[54] METHOD AND DEVICE FOR AUTOMATICALLY CONTROLLING WELDING CONDITIONS FOR USE IN AN ARC WELDING MACHINE

[75] Inventor: Hideo Suzuki, Yokohama, Japan

[73] Assignee: Okamura Corporation, Yokohama, Japan

[21] Appl. No.: 317,879

[22] Filed: Nov. 3, 1981

[51] Int. Cl.³ .............................................. B23K 9/10
[52] U.S. Cl. ............................................. 219/137 PS
[58] Field of Search ............. 219/130.5, 137 PS, 130.1

[56] References Cited

U.S. PATENT DOCUMENTS

| 3,581,051 | 5/1971 | Brown | 219/130.5 |
| 3,689,734 | 9/1972 | Burley et al. | 219/130.5 |
| 3,715,560 | 2/1973 | Emmerson | 219/130.5 |

FOREIGN PATENT DOCUMENTS 1317893  5/1973  United Kingdom ............. 219/130.5

Primary Examiner—C. C. Shaw
Attorney, Agent, or Firm—Holman & Stern

[57] ABSTRACT

A method and device for automatically controlling welding conditions for use in an arc welding machine, wherein an ignition or turn-on phase of a thyristor is controlled by an output of a first potentiometer to which a fixed voltage is applied. A voltage difference between the movable terminals of the first and a second potentiometer which are coupled in parallel, is detected by a differential amplifier which outputs a signal corresponding to the difference to a motor. The motor turns the movable terminals of the second and a third potentiometer which are operated synchronously, so that the detected difference may be zero. The output of the third potentiometer to which a fixed reference voltage is applied, is stored in a memory in a recording mode. Then, in a welding mode, the outputs of the third potentiometer and the memory are fed to the differential amplifier which controls the motor in the same manner as above, while the first potentiometer is replaced by the second potentiometer, thereby controlling welding conditions such as a welding voltage and a welding current.

4 Claims, 3 Drawing Figures

METHOD AND DEVICE FOR AUTOMATICALLY CONTROLLING WELDING CONDITIONS FOR USE IN AN ARC WELDING MACHINE

BACKGROUND OF THE INVENTION

The present invention relates to a method and device for automatically controlling welding conditions for use in an arc welding machine.

When a steel plate is welded by an arc or electric welding, in order to obtain the best welding result, conditions such as welding voltage, welding current, welding speed, and so forth, are properly set up.

When such welding conditions are changed in the course of the welding operation, for example, on the conditions 19 V×100 A between the points A and B, and 20 V×130 A between the points B and C, these conditions between the points A and C are readily stored in a memory. However, the following problems are raised when the welding operation is carried out.

Although the setup of the welding conditions of generally used welding machines is somewhat different in detail depending on their manufacturers, however, it is basically the same, and is carried out as follows.

(1) The welding voltage adjustment:

A dial of a potentiometer of a remote controller is turned to change a voltage.

An ignition or turn-on phase of a thyristor is changed according to the voltage change.

The output direct voltage for welding is changed.

(2) The welding current adjustment:

A dial of a potentiometer of a remote controller is turned to change a voltage.

An ignition or turn-on phase of a thyristor is changed according to the voltage change.

The rotation number of a motor for feeding a welding rod or wire is changed.

The feeding speed of the welding rod of wire is changed.

The welding current is changed.

FIG. 1 shows simply a conventional voltage control circuit A for a conventional arc or electric welding machine generally used, which comprises a remote control part 1 including a potentiometer $VR_1$ for adjusting a voltage, a welding control part 2, and a connection cable 3 which couples the two parts 1 and 2. The welding control part 2 comprises a conventional voltage regulator 4, half-fixed potentiometer $VR_2$ and $VR_3$ which determine the upper and the lower limits of the output voltage, and a phase controller 5 which controls a main thyristor (not shown).

A fixed voltage is supplied to both the terminals of the potentiometer $VR_1$ from the voltage regulator 4, and thus, when the potentiometer $VR_1$ is turned, the input voltage of the phase controller 5 is varied, with the result that the phase of the output pulse is varied.

Therefore, when the potentiometer $VR_1$ is turned, the output voltage of the main thyristor, i.e. the output voltage of the welding machine, is changed. Accordingly, in order to change the welding voltage during the welding operation, the potentiometer $VR_1$ is turned by means of a motor depending on data read out of the memory. That is, the reconstruction of the remote control part 1 is required accordingly.

The welding current control can be carried out by utilizing the phase controller together with the thyristor, and the potentiometer in the same manner as described above.

Meanwhile, the action of the thyristor can directly be controlled by the output of the memory, but this method involves the reconstruction of the welding machine.

In the embodiments described above, the reconstruction of the welding machine or the change of the control circuit of the same, or a particularly specified welding machine for exclusive use is required, which is not preferable nor recommendable and requires often high cost.

SUMMARY OF THE INVENTION

It is an object of the present invention to provide a method for automatically controlling welding conditions for use in an arc welding machine, which method is free from the aforementioned disadvantages, yet is simple, stable and reliable.

It is another object of the present invention to provide a device for automatically controlling welding conditions for use in an arc welding machine, which device is free from the aforementioned disadvantages, yet is simple, stable and reliable.

According to the present invention there is provided a method for automatically controlling welding conditions for use in an arc welding machine, wherein an ignition or turn-on phase of a thyristor is controlled by an output of a first potentiometer to which a fixed voltage is applied, thereby controlling welding conditions such as a welding voltage and a welding current, the improvement which comprises the steps of (a) detecting a difference between voltages of movable terminals of the first and a second potentiometer which are coupled in parallel at one end directly and at the other end via a voltage follower circuit, by a differential amplifier to which the two voltages of the movable terminals are applied, (b) turning movable terminals of the second and a third potentiometers which are operated synchronously or cooperatively, according to the detected voltage difference by a motor so that the detected voltage difference may be zero, (c) storing the output of the third potentiometer to which a fixed reference voltage is applied, into a memory, (d) feeding the output read out of the memory and the output of the third potentiometer into the differential amplifier, (e) detecting the voltage difference between the two outputs by the differential amplifier, and (f) turning the movable terminal of the second potentiometer according to the detected voltage difference by the motor, while the first potentiometer is replaced by the second potentiometer in order to control the ignition phase of the thyristor.

According to the present invention there is also provided a device for automatically controlling welding conditions for use in an arc welding machine, wherein an ignition or turn-on phase of a thyristor is controlled by an output of a first potentiometer to which a fixed voltage is applied, thereby controlling the welding conditions such as a welding voltage and a welding current, the improvement which comprises (a) a second potentiometer which is coupled in parallel with the first potentiometer at one end directly and at the other end via first and second switches and a voltage follower circuit, (b) a differential amplifier to which the movable terminals of the first and the second potentiometer are connected via third, fourth and fifth switches, and which detects the difference between the voltages at the two movable terminals and provides an output signal corresponding to the voltage difference detected, (c) a third potentiometer to which a fixed reference voltage is applied, and which is operated in synchronization or cooperatively with the second potentiometer, (d) a motor connected to the differential amplifier, which is driven according to the output signal thereof, and turns simultaneously the movable terminals of the second and the third potentiometer so that the voltage difference between the removable terminals of the first and the second potentiometer may be zero, and (e) a memory whose input is connected to the movable terminal of the third potentiometer via a sixth switch, the four elements being aligned as described above in a recording mode, wherein in a welding mode, the first is replaced by the second potentiometer by turning the first and the second switches, the output of the third potensiometer and the output read out of the memory are fed to the differential amplifier by turning the fourth, the fifth and the sixth switches, and the motor turns the movable terminal of the second potentiometer according to the output signal of the differential amplifier by the motor so that the voltage difference of the two outputs may be zero, while the first potensiometer and the voltage follower circuit are not acted.

BRIEF DESCRIPTION OF DRAWINGS

In order that the present invention may be better understood, a preferred embodiment thereof will be described with reference to the accompanying drawings, in which.

DESCRIPTION OF THE PREFERRED EMBODIMENT

Figure 1:
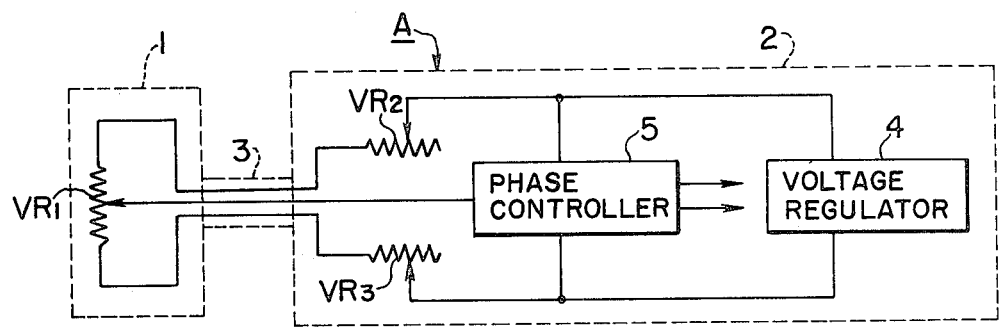
FIG. 1 is a schematic view of a conventional voltage control circuit for a conventional arc welding machine.
Figure 2:
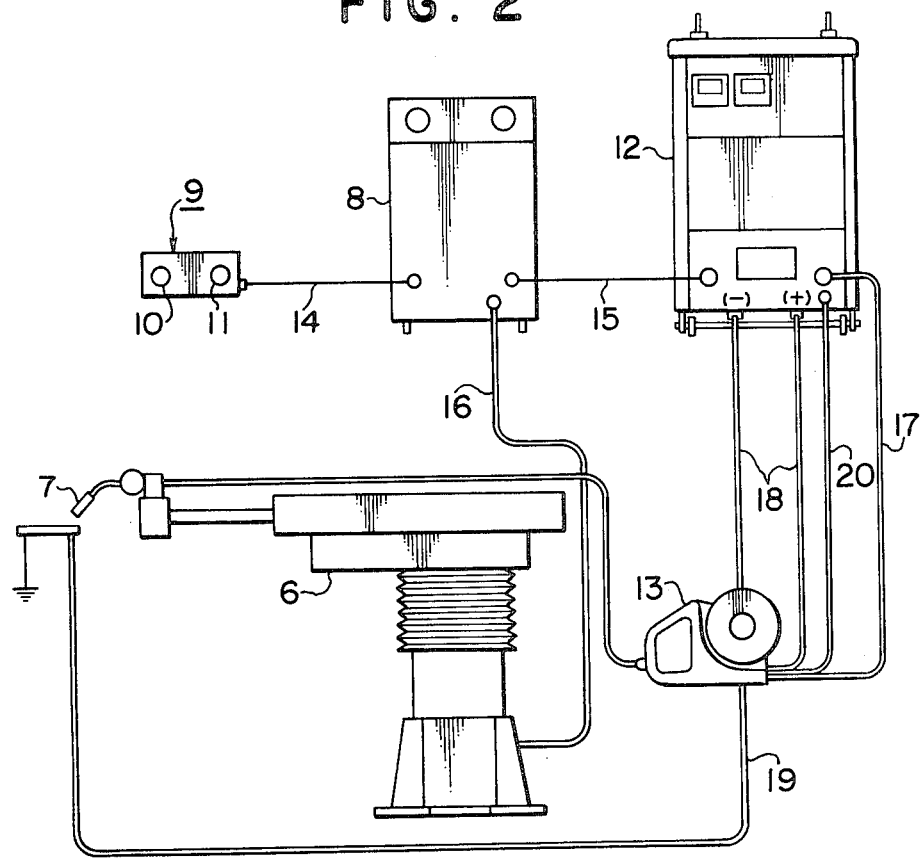
FIG. 2 is a schematic view of an arc welding machine in which the present invention is applied.

Referring to the drawings there is shown in FIG. 2 an arc or electric welding machine wherein the present invention is applied, comprising a robot 6 which connects the welding, a welding head 7 connected thereto, a robot controller 8 including an automatic welding control means, which is connected to the robot 6 via a cable 16, a remote controller 9 including voltage and current adjusting dials 10 and 11, which is connected to the robot controller 8 via a cable 14 which corresponds to the connection cable 3 shown in FIG. 1, a welding machine 12 of a standard type, which is connected to the robot controller 8 via a cable 15, and which leads to the ground via a ground cable 19 and an object to be welded, and a welding rod or wire feeder 13 which feeds a welding rod or wire and a gas to the welding head 7, and which is connected to the welding machine 12 via a cable 17, an output cable 18 and a gas hose 20.

Figure 3:
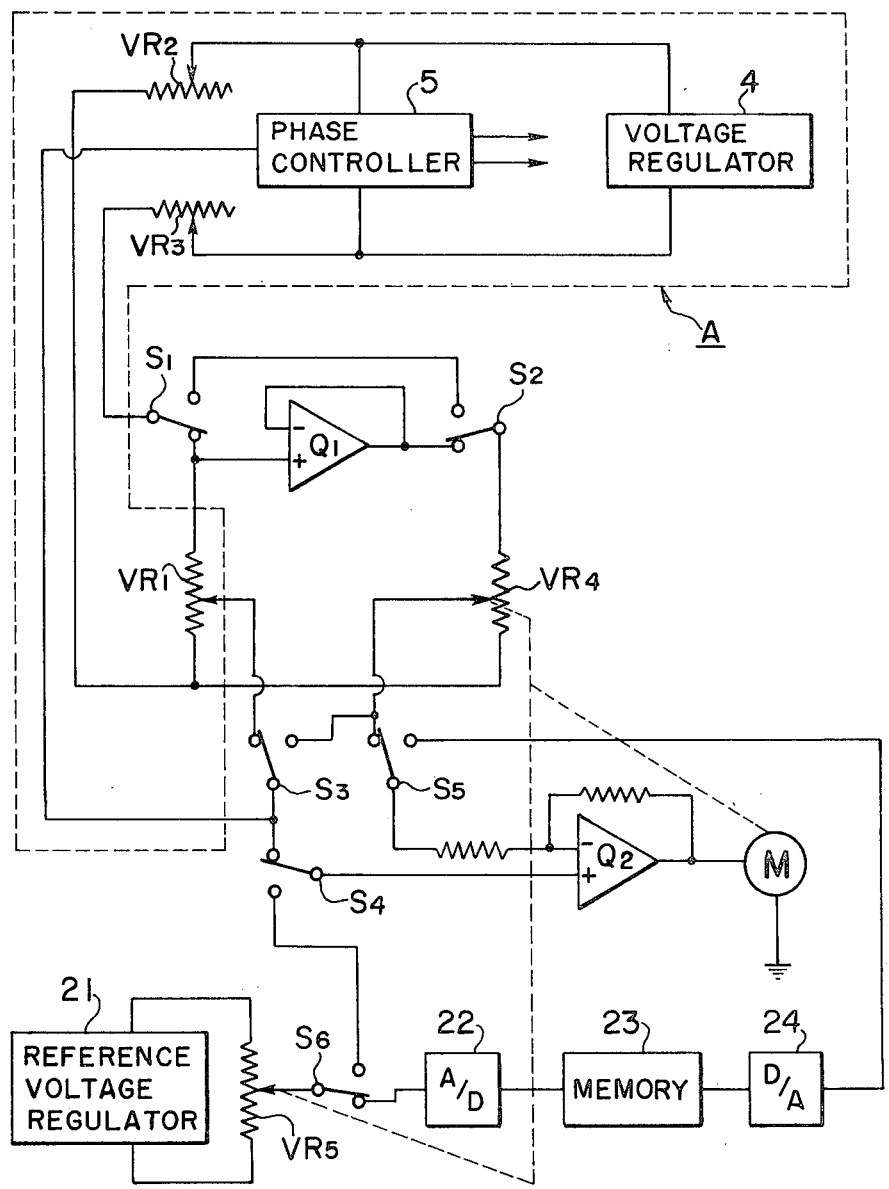
FIG. 3 is a schematic view of a circuit for performing a method for automatically controlling welding conditions according to the present invention.

In FIG. 3 there is shown a control circuit which performs a method for automatically controlling welding conditions according to the present invention, wherein the same numbers as those in FIG. 1 denote the same elements.

The potentiometer $VR_1$ of the voltage control circuit A is included in the remote controller 9 of FIG. 2, and the other elements are included in the robot controller 8 which conducts the welding operation.

In FIG. 3, $S_1$, $S_2$, ... and $S_6$ denote turn switches and are synchronous or cooperative, i.e. are operated in the same time, and these switches are now positioned in the recording mode for which the welding conditions are stored into a memory 23 hereinafter mentioned.

A pair of potentiometer $VR_4$ and $VR_5$ are operated synchronously or cooperatively, i.e. are operated in the same time, and thus constitute a double potentiometer.

One end of each of the potentiometers $VR_1$ and $VR_4$ are connected together, and the other ends of the same are coupled via the switches $S_1$ and $S_2$ and a voltage follower circuit $Q_1$ comprising an operational amplifier.

The voltage follower circuit $Q_1$ has an amplification rate of unity, and its input impedance is very high. Hence, the voltage between the terminals of the potentiometer $VR_1$ generates, as it is, between both the terminals of the potentiometer $VR_4$.

The movable terminals of the potentiometer $VR_1$ and $VR_4$ are applied to positive and negative terminals of a differential amplifier $Q_2$ comprising an operational amplifier via the switches $S_3$ and $S_4$ and the switch $S_5$, respectively. The output signal of the differential amplifier $Q_2$ drives a motor M which turns the movable terminals of the potentiometer $VR_4$ and $VR_5$.

The potentiometer $VR_5$ is supplied by a fixed reference voltage generated by a reference voltage regulator 21, and its movable terminal is connected to the memory 23 via the switch $S_6$ and an analog-digital (A/D) converter 22.

When the potentiometer $VR_1$ is turned manually in the same manner as the voltage adjustment of the conventional welding machine, the voltage difference occurs between the movable terminals of the potentiometers $VR_1$ and $VR_4$, i.e. between the input voltages of the voltage follower circuit $Q_1$, and then the motor M turns the movable terminal of the potentiometer $VR_4$ so that the voltage difference may become nought.

Then, since the potentiometer $VR_5$ is operated by the motor M in synchronization or cooperation with the potentiometer $VR_4$, the movable terminal of the potentiometer $VR_5$ is simultaneously turned, and thus the input of the A/D converter 22 is proportional to the voltage at the movable terminal of the potentiometer $VR_1$. Accordingly, the value set up in the potentiometer $VR_1$ is stored in the memory 23 as a digital value, in the same manner as the voltage control of the conventional welding machine.

In this embodiment, the two potentiometers $VR_4$ and $VR_5$ are electrically isolated, and therefore the ground level difference between the welding machine side and the memory side, the noise trouble, and so forth, do not exert a bad influence on the values stored in the memory 23.

Next, in order to conduct the welding operation by using the welding machine 12 and robot 6 of FIG. 2, the cooperative switches $S_1$–$S_6$ are turned. Then, a digital-analog (D/A) converter 24 connected to the memory 23 converts the output of the memory 23 into an analog value which is fed to the negative terminal of the differential amplifier $Q_2$ via the switch $S_5$. The output of the potentiometer $VR_5$ is fed to the positive terminal of the differential amplifier $Q_2$ via the switches $S_4$ and $S_6$. Thus, the motor M turns the movable terminals of the potentiometer $VR_4$ and $VR_5$ so that the voltage difference between the two input values may become zero.

In the welding mode, since the switches $S_1$–$S_6$ are turned as described above, the potentiometer $VR_1$ and the voltage follower circuit $Q_1$ are not operative, and the potentiometer $VR_4$ is connected to the voltage control circuit A instead of the potentiometer $VR_1$. Consequently, the voltage control circuit A controls the welding voltage depending on the output of the potentiometer VR$_4$, i.e. the recorded value in the memory 23.

According to the present invention, as described above, the welding machine of the standard type of a low cost is used, the connection of the terminals of the potentiometer VR$_1$ are changed, the cable 3 of the conventional circuit is replaced by the cable 14 of the present invention, and the control circuit shown in FIG. 3 except the potentiometer VR$_1$ is provided to the robot controller 8, thereby obtaining the arc welding machine which is capable of performing automatic control of the welding conditions freely.

It is readily understood from the above description, that the welding current control can be carried out in the same manner as the welding voltage control described above, and therefore its description will be omitted.

Although the present invention has been described with reference to a preferred embodiment thereof, however, various changes and modification thereof can be made by those skilled in the art without departing from the scope of the present invention.

What is claimed is:

1. A method for automatically controlling welding conditions for use in an arc welding machine, wherein an ignition or turn-on phase of a thyristor is controlled by an output of a first potentiometer to which a fixed voltage is applied, thereby controlling a welding voltage and a welding current, the improvement which comprises the steps of:
    (a) detecting a difference between voltages of movable terminals of the first potentiometer and a second potentiometer which are coupled together at one end directly and coupled at a second end through a voltage follower circuit, by a differential amplifier to which the two voltages of the movable terminals are input;
    (b) turning movable terminals of the second potentiometer and a third potentiometer which are operated synchronously by a motor so that the voltage difference detected between the movable terminals of the second and third potentiometers may be zero;
    (c) storing the output of the third potentiometer to which a fixed reference voltage is applied, into a memory;
    (d) feeding the output read out of the memory and the output of the third potentiometer into the differential amplifier;
    (e) detecting the voltage difference between the two outputs by the differential amplifier; and
    (f) turning the movable terminal of the second potentiometer according to the detected voltage difference by the motor, while the first potentiometer is replaced by the second potentiometer in order to control the ignition phase of the thyristor.

2. A method as defined in claim 1, wherein the output of the third potentiometer is converted in an analog-digital converter into a digital signal which is to be stored in the memory, and wherein the output read out of the memory is converted in a digital-analog converter into an analog signal which is to be sent to the differential amplifier.

3. A device for automatically controlling welding conditions for use in an arc welding machine, wherein an ignition or turn-on phase of a thyristor is controlled by an output of a first potentiometer to which a fixed voltage is applied, thereby controlling the welding conditions such as a welding voltage and a welding current, the improvement which comprises:
    (a) a second potentiometer which is coupled in parallel with the first potentiometer at one end directly and at the other end via first and second switches and a voltage follower circuit;
    (b) a differential amplifier to which the movable terminals of the first and the second potentiometers are connected via third, fourth and fifth switches, and which detects the difference between the voltages at the two movable terminals and outputs a signal corresponding to the voltage difference detected;
    (c) a third potentiometer to which a fixed reference voltage is applied, and which is operated at the same time with the second potentiometer;
    (d) a motor connected to the differential amplifier, which is driven according to the output signal thereof, and turns simultaneously the movable terminals of the second and the third potentiometers so that the voltage difference between the removable terminals of the first and the second potentiometers may be zero; and
    (e) a memory whose input is connected to the movable terminal of the third potentiometer via a sixth switch, said four elements being aligned as described above in a recording mode, wherein in a welding mode, the first potentiometer is replaced by the second potentiometer and the output read out of the memory are fed to the differential amplifier by turning the fourth, the fifth and the sixth switches, and the motor turns the movable terminal of the second potentiometer according to the output signal of the differential amplifier by the motor so that the voltage difference of the two outputs may be zero, while the first potentiometer and the voltage follower circuit are not acted.

4. A device as defined in claim 3, wherein the output of the third potentiometer is converted in an analog-digital converter into a digital signal which is to be stored in the memory in a recording mode, and wherein the output read out of the memory is converted in a digital-analog converter into an analog signal which is to be sent to the differential amplifier in a welding mode.

* * * * *